United States Patent
Yabe et al.

(10) Patent No.: US 12,553,471 B2
(45) Date of Patent: Feb. 17, 2026

(54) ROLLING DEVICE

(71) Applicant: NSK LTD., Tokyo (JP)

(72) Inventors: Toshikazu Yabe, Kanagawa (JP); Keisuke Yokoyama, Kanagawa (JP); Shintaro Honda, Kanagawa (JP); Nariaki Aihara, Kanagawa (JP)

(73) Assignee: NSK LTD., Tokyo (JP)

( * ) Notice: Subject to any disclaimer, the term of this patent is extended or adjusted under 35 U.S.C. 154(b) by 51 days.

(21) Appl. No.: 18/578,533

(22) PCT Filed: Mar. 25, 2022

(86) PCT No.: PCT/JP2022/014517
§ 371 (c)(1),
(2) Date: Feb. 21, 2024

(87) PCT Pub. No.: WO2023/286384
PCT Pub. Date: Jan. 19, 2023

(65) Prior Publication Data
US 2024/0384759 A1    Nov. 21, 2024

(30) Foreign Application Priority Data

Jul. 12, 2021 (JP) ................................. 2021-114748
Jul. 13, 2021 (JP) ................................. 2021-115415
(Continued)

(51) Int. Cl.
*F16C 29/06* (2006.01)
*F16C 33/38* (2006.01)
(Continued)

(52) U.S. Cl.
CPC ............ *F16C 33/416* (2013.01); *F16C 29/06* (2013.01); *F16C 33/3818* (2013.01);
(Continued)

(58) Field of Classification Search
CPC ...... F16C 19/06; F16C 29/06; F16C 29/0638; F16C 29/064; F16C 29/0642;
(Continued)

(56) References Cited

U.S. PATENT DOCUMENTS

2003/0128901 A1    7/2003    Yabe et al.
2006/0101935 A1    5/2006    Nakatani et al.
(Continued)

FOREIGN PATENT DOCUMENTS

EP    3 677 662 A1    7/2020
JP    2003-171683 A    6/2003
(Continued)

OTHER PUBLICATIONS

JP2020056417_A_Description.*
(Continued)

*Primary Examiner* — Phillip A Johnson
(74) *Attorney, Agent, or Firm* — Sughrue Mion, PLLC

(57) ABSTRACT

A linear motion device includes a linear motion body that is fitted onto a screw shaft and moves straight along the screw shaft, a large number of balls held in a ball groove formed on an inner surface side of the linear motion body and rolling between the ball groove and the screw shaft, a separator interposed between each ball, a circulation passage formed in the linear motion body and circulating the ball from one end side of the ball groove to the other end side, where at least one of the separator and the circulation passage is formed from polyamide 410 by injection molding.

9 Claims, 5 Drawing Sheets

(30) Foreign Application Priority Data

Sep. 27, 2021 (JP) ................................ 2021-156281
Sep. 27, 2021 (JP) ................................ 2021-156282

(51) Int. Cl.
  *F16C 33/41* (2006.01)
  *F16C 33/44* (2006.01)
  *F16C 33/66* (2006.01)
(52) U.S. Cl.
  CPC .......... *F16C 33/44* (2013.01); *F16C 33/6633* (2013.01); *F16C 2208/60* (2013.01)
(58) Field of Classification Search
  CPC .............. F16C 29/0645; F16C 29/0647; F16C 29/0654; F16C 29/0657; F16C 29/0659; F16C 29/0671; F16C 29/0685; F16C 29/0688; F16C 29/069; F16C 33/3818; F16C 33/416; F16C 33/44; F16C 33/6633; F16C 2208/60; F16H 25/2233; F16H 25/2238
  See application file for complete search history.

(56) References Cited

U.S. PATENT DOCUMENTS

| | | | |
|---|---|---|---|
| 2007/0220997 A1 | 9/2007 | Nakatani et al. | |
| 2010/0316315 A1 | 12/2010 | Shimazu et al. | |
| 2014/0256864 A1 | 9/2014 | Isago et al. | |
| 2015/0298725 A1* | 10/2015 | Kichikawa | B62D 5/0409 180/446 |
| 2017/0348881 A1 | 12/2017 | Hayashi et al. | |

FOREIGN PATENT DOCUMENTS

| | | | |
|---|---|---|---|
| JP | 2003-207014 A | 7/2003 | |
| JP | 2005029752 A * | 2/2005 | .......... F16C 33/6633 |
| JP | 2006-170308 A | 6/2006 | |
| JP | 4282924 B2 | 6/2009 | |
| JP | 2009-204121 A | 9/2009 | |
| JP | 2010-71342 A | 4/2010 | |
| JP | 2014-98680 A | 5/2014 | |
| JP | 2016-121735 A | 7/2016 | |
| JP | 2019-44061 A | 3/2019 | |
| JP | 2020-56417 A | 4/2020 | |
| JP | 2020-111636 A | 7/2020 | |
| WO | 2013/046682 A1 | 4/2013 | |
| WO | WO-2019044942 A1 * | 3/2019 | .......... C10M 1119/20 |
| WO | WO-2021070888 A1 * | 4/2021 | .......... C10M 115/08 |

OTHER PUBLICATIONS

Extended European Search Report dated Oct. 21, 2024, issued by the European Patent Office in European Application No. 22841734.1.

International Search Report (PCT/ISA/210) dated Jun. 14, 2022, issued by the International Searching Authority in counterpart International Application No. PCT/JP2022/014517.

Written Opinion (PCT/ISA/237) dated Jun. 14, 2022, issued by the International Searching Authority in counterpart International Application No. PCT/JP2022/014517.

Communication dated Oct. 21, 2025, issued by the Japanese Patent Office in Japanese Application No. 2023-535133.

* cited by examiner

CROSS-SECTIONAL VIEW

FRONT VIEW

ROLLING DEVICE

CROSS-REFERENCE TO RELATED APPLICATIONS

This application is a National Phase Entry of PCT International Application No. PCT/JP2022/014517 filed on Mar. 25, 2022, which claims priority to Japanese Patent Application No. 2021-114748 filed on Jul. 12, 2021, Japanese Patent Application No. 2021-115415 filed on Jul. 13, 2021, Japanese Patent Application No. 2021-156281 filed on Sep. 27, 2021, and Japanese Patent Application No. 2021-156282 filed on Sep. 27, 2021, the contents of all of which are incorporated herein by reference in their entirety.

TECHNICAL FIELD

The present invention relates to a linear motion device such as a linear guide device or a ball screw that incorporates a separator between rolling elements, or a rolling device such as a wheel rolling bearing that incorporates a retainer that retains a rolling element.

BACKGROUND ART

Examples of a rolling device configured of a first member and a second member that are movable relative to each other via an incorporated rolling element include a linear motion device such as a linear guide device and a ball screw, a wheel rolling bearing, and the like.

For example, as illustrated in FIG. 1, a linear guide device 10 includes a guide rail (first member) 1 having a rolling groove 3 on the outer surface thereof, and a slider (second member) 2 assembled to straddle the guide rail 1. A surface of the slider 2 facing the rolling groove 3 of the guide rail 1 is partially open, and together with the rolling groove 3 of the guide rail 1, forms a ball circulation path 4 having a substantially track-shaped cross section. A large number of balls (rolling elements) B are accommodated inside the ball circulation path 4 in a rollable manner (see Patent Literature 1).

For example, as illustrated in FIG. 2, a ball screw device 20 is disposed such that a ball nut (second member) 12 encloses a screw shaft (first member) 11, and a plurality of balls (rolling elements) B are disposed in a rollable manner in a space formed by a thread groove 12a spirally formed on an inner periphery of the ball nut 12 and a thread groove 11a spirally formed on an outer periphery of the screw shaft 11 facing the thread groove 12a. A ball tube 13 having a substantially U-shaped outer shape is attached to the ball nut 12 so that both ends of the ball tube 13 face the thread groove 11a of the screw shaft 11. The ball B is scooped up from one end of the ball tube 13 after going around the screw shaft 11 multiple times inside the ball nut 12, and then the ball B passes through a ball circulation path 18 and returns to the thread groove 11a of the screw shaft 11 from the other end of the ball tube 13, repeating the circulation.

In such linear guide device 10 and ball screw 20, a separator (holding member) interposed between the balls B has been used to eliminate collision noise between balls during driving. For example, FIG. 3 is an enlarged view illustrating inside of the ball circulation path 4 of the linear guide device 10, and a row of balls is formed in which separators 100 are interposed between the balls B. The separator 100 has concave surfaces 101 having an arcuate cross section formed on both sides corresponding to outer circumferential surfaces of the balls B, and the balls B are held by the concave surfaces 101 to be able to freely roll during circulation in the ball circulation path 4.

As a material of the separator 100, non-reinforced polyamide 66 (PA66), polyester thermoplastic elastomer, and the like are generally used. In a linear motion device, an internal space is generally filled with grease, and additional grease is supplied from a grease nipple or the like as necessary for lubrication. As a related art related thereto, Patent Literature 1 of the present applicant can be mentioned.

However, the above-described separator made of PA66 resin causes dimensional changes due to inflow and outflow of moisture, and in the worst case, as illustrated in FIG. 4, the separator 100 may fall down in a circulation path, causing malfunction of the linear motion device. All of the materials, including polyester thermoplastic elastomer used separately, were derived from petroleum and were not environmentally friendly.

As grease filled in an internal space of a linear motion device, mineral oils and poly-α-olefin oils with low polarity, and of which main components are aliphatic hydrocarbons, are most commonly used. Nylon 66 resin and polyester thermoplastic elastomer, which have many amide bonds in molecular structures, have very different molecular structures, so the materials have poor wettability and adhesion of grease to separators are insufficient.

Aliphatic polyamide-based materials with low water absorption and few amide bonds in the molecular structure include polyamide 11 (melting point 187° C.) and polyamide 12 (melting point 176° C.). Due to the low melting point, when the linear motion device operates at high speed and an internal temperature rises, there is a risk that polyamide will soften and deform the separator.

As a wheel rolling bearing, a wheel rolling bearing for supporting a driven wheel supported by an independent type suspension, for example, as disclosed in Patent Literature 2, or a wheel rolling bearing for supporting a drive wheel supported by a suspension device by a mounting portion formed on an outer circumferential surface of an outer ring, which is a fixed wheel, as disclosed in Patent Literature 3, are known.

In the related arts, regarding a synthetic resin retainer (holding member) that is incorporated into such a wheel rolling bearing and holds a plurality of rolling elements in a rollable manner between an inner ring (first member) and an outer ring (second member), the most commonly used synthetic resin retainer is one made of 66 nylon resin that is unreinforced or reinforced with 10% by weight glass fiber.

However, synthetic resin retainers of the related art based on 66 nylon resin cause dimensional changes due to the inflow and outflow of moisture, and in the worst case, there is a risk of interference with the inner and outer rings and the rolling element of the rolling bearing, resulting in adverse effects.

As grease filled in an internal space of a wheel rolling bearing, mineral oil and poly-α-olefin oil with low polarity, the main component of which is an aliphatic hydrocarbon, are most often used.

However, since the molecular structure of the 66 nylon resin, which has many amide bonds in the molecular structure, is significantly different, the wettability is poor and the adhesion of the grease to the retainer is insufficient. Aliphatic polyamide-based materials with low water absorption and few amide bonds in the molecular structure include polyamide 11 (melting point 187° C.) and polyamide 12 (melting point 176° C.). However, because of the low melting point, when a bearing temperature rises due to high-speed rotation, there is a risk that polyamide will soften and deform the retainer.

CITATION LIST

Patent Literature
Patent Literature 1: JP4282924B
  Patent Literature 2: JP2006-170308A
  Patent Literature 3: JP2010-71342A

SUMMARY OF INVENTION

Technical Problem

The present invention is made focusing on such situation, and an object of the present invention is to provide highly reliable and environmentally friendly linear motion devices and rolling devices such as wheel rolling bearings that improve a dimensional stability, ductility, and adhesion of greases based on poly-α-olefin oil, which are required for holding members such as separators and retainers, and also prevents deformation at high speeds.

Solution to Problem

To achieve the object, a first invention provides a rolling device that includes a first member and a second member that are movable relative to each other, a rolling element installed between the first member and the second member, and a holding member that holds the rolling element, where
  the holding member is formed from a polyamide resin composition made of polyamide 410.
According to a second invention, in the first invention, the rolling device is a linear motion device in which the first member is a shaft, the second member is a linear motion body that moves straight along the shaft, the rolling element is a large number of balls held in a ball groove formed on an inner surface side of the linear motion body and rolling between the ball groove and the shaft, and the holding member is a separator interposed between each of the balls, and a circulation passage is provided that is formed in the linear motion body and circulates the balls from one end side to the other end side of the ball groove.
According to a third invention, in the second invention, at least one of the separator and the circulation passage is formed of a polyamide resin composition made of polyamide 410.
According to a fourth invention, in the second invention, a part of a surface of at least one of the separator and the circulation passage is formed of a polyamide resin composition made of polyamide 410.
According to a fifth invention, in the first invention, the first member is an inner ring,
  the second member is an outer ring, and the holding member is a synthetic resin retainer.
According to a sixth invention, in the fifth invention, the polyamide resin composition further includes a reinforcing fiber material.
According to a seventh invention, in any one of the first to sixth inventions, a bio degree of polyamide 410 is 100%.
According to an eighth invention, in the seventh invention, an internal space of the rolling device is filled with grease, and
  a main component of base oil of the grease is poly-α-olefin oil.

According to a ninth invention, in the seventh invention, an internal space of the rolling device is filled with grease, and
  the grease is biodegradable grease.

Advantageous Effects of Invention

According to the present invention, it is possible to provide a highly reliable and environmentally friendly rolling device that improves a dimensional stability, ductility, and adhesion of greases based on poly-α-olefin oil, which are required for holding members such as separators and retainers, and also prevents deformation at high speeds.

According to the present invention, by applying polyamide 410, which has a certain level of heat resistance and has lower water absorption than polyamide 66, to the resin material of the holding member of the rolling device, it is possible to provide a rolling device that can be used in various environments and has both high reliability and low cost.

Polyamide 410 has a bio degree of 100% and is carbon neutral, so compared to materials such as polyamide 66 of the related arts, which contains only petroleum-derived components and has a bio degree of 0%, it is possible to create a rolling device that is more environmentally friendly.

Since polyamide 410 has a melting point close to that of polyamide 66, polyamide 410 can be used as a substitute in applications where polyamide 66 was used.

Since there is a C10 part (derived from sebacic acid) that has a long-chain hydrocarbon part between the amide groups, by applying a grease configured of a base oil of which the main component is poly-α-olefin oil, which has a similar molecular structure, good wettability to the resin material is maintained, and thus abrasion of the resin part is effectively prevented and the lifespan of the linear motion device can be extended.

When the grease is biodegradable, the linear motion device can be made even more environmentally friendly.

DESCRIPTION OF EMBODIMENTS

Hereinafter, embodiments of the present invention will be described in detail.

First Embodiment

In the present embodiment, as an example of a rolling device of the present invention, an embodiment will be described in which the present invention is used in a separator of a linear motion device. There is no restriction on the type of the linear motion device, and examples thereof include a linear guide device 10 as illustrated in FIG. 1 and a ball screw device 20 as illustrated in FIG. 2.

Figure 1:
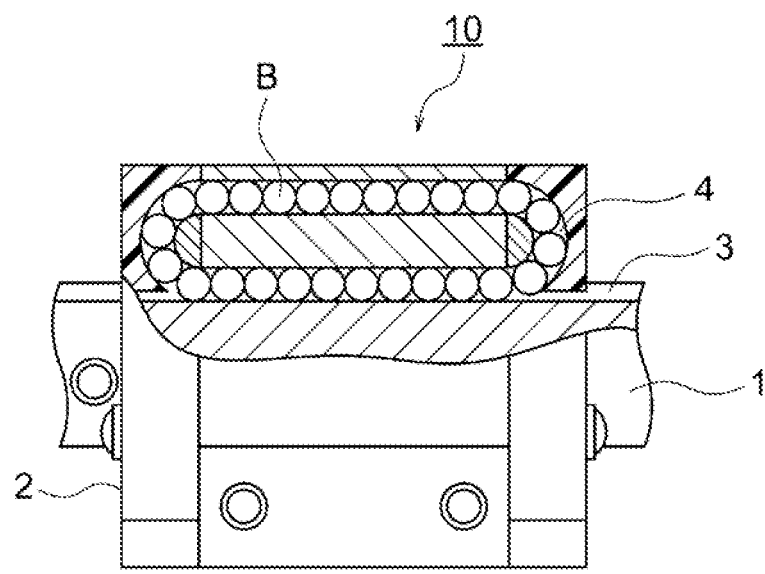
FIG. 1 is a partially cutaway plan view illustrating a linear guide device that is an example of a rolling device.

FIG. 1 includes a guide rail (first member) 1 having a rolling groove 3 on the outer surface thereof, and a slider (second member) 2 assembled to straddle the guide rail 1. A surface of the slider 2 facing the rolling groove 3 of the guide rail 1 is partially open, and together with the rolling groove 3 of the guide rail 1, forms a ball circulation path 4 having a substantially track-shaped cross section. An example of a linear guide is shown in which a large number of balls (rolling elements) B are accommodated inside the ball circulation path 4 in a rollable manner via separators (holding members).

Figure 2:
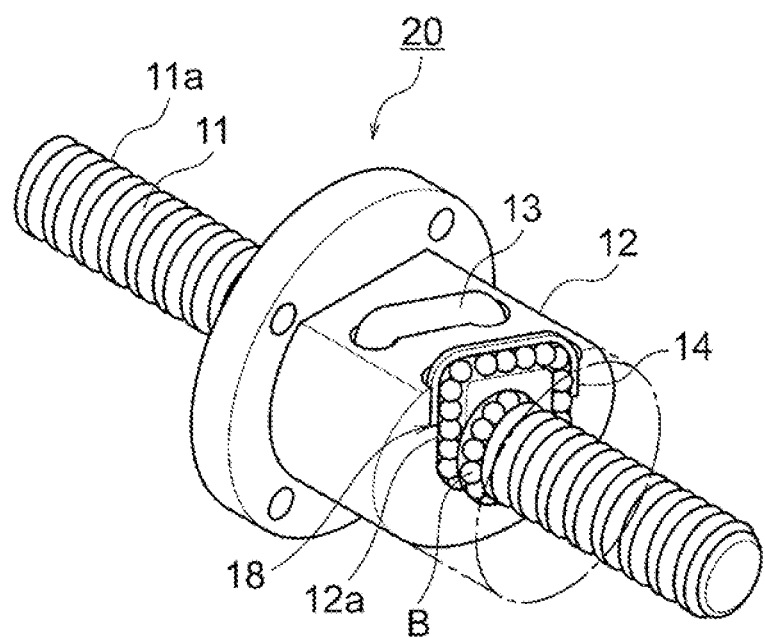
FIG. 2 is a partially cutaway perspective view illustrating a ball screw device that is another example of a rolling device.

FIG. 2 illustrates an example of a ball screw including a nut (second member) 12 that is fitted onto a screw shaft 11 (first member) and moves straight along the screw shaft 11, a large number of balls (rolling elements) B held in a ball groove 14 formed on an inner surface side of the nut 12 and rolling between the ball groove 14 and the screw shaft 11, a separator (holding member) interposed between each ball B, and a circulation passage 18 formed in the nut 12 and circulating the balls B from one end side of the ball groove 14 to the other end side.

Figure 3:
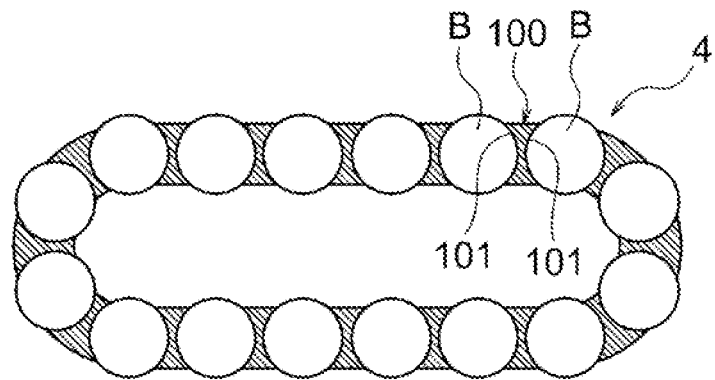
FIG. 3 is a plan view illustrating inside of a ball circulation path of the linear guide device illustrated in FIG. 1.
Figure 4:
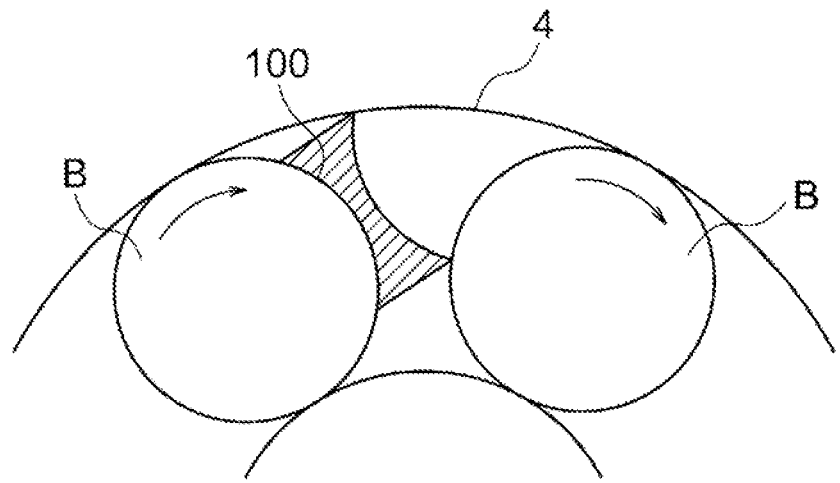
FIG. 4 is a partially enlarged view of FIG. 3 for illustrating a problem with a separator of the related arts.

Although not illustrated in FIGS. 1 and 2, as illustrated in FIG. 3, a separator 100 is interposed between the balls B to eliminate collision noise between the balls.

Figure 5:
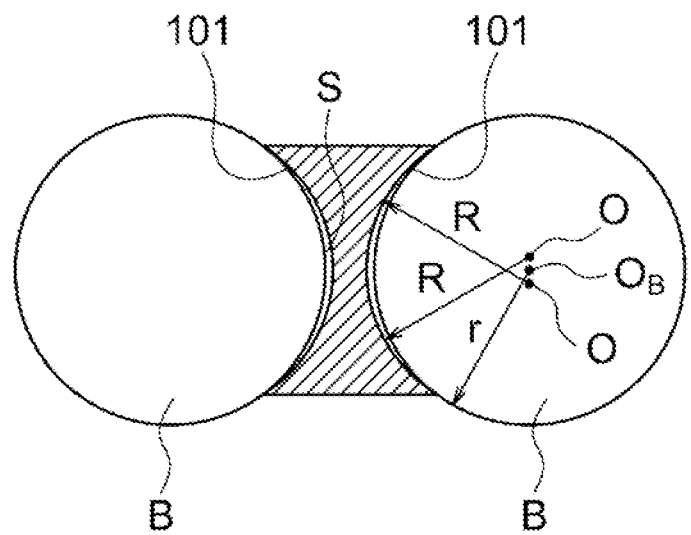
FIG. 5 is a cross-sectional view illustrating an example of a separator.

For example, as illustrated in FIG. 5, in the separator 100, a center O of a radius of curvature R forming a concave surface 101 may be displaced from a center OB of the ball B and provided at two locations. As a result, a gap S is formed between the concave surface 101 of the separator 100 and the ball B, and grease (not illustrated) flows into the gap S, allowing the ball B to roll smoothly. Although a surface of the concave surface 101 may be flat, a rough surface is preferable because the concave surface 101 can retain grease. The appropriate degree of surface roughness is approximately 5 μm to 50 μm in terms of surface roughness Rmax.

Concentric or spiral grooves may be formed on a surface of the concave surface 101 of the separator 100. A through hole may be provided in the separator 100 so that the grease can easily flow into the gap between the concave surface 101 of the separator 100 and the ball B. For example, in the separator 100 illustrated in FIGS. 6A and 6B, a through hole 102 penetrates through a center of the concave surface 101, and a plurality of grooves 103 are formed concentrically around the through hole 102, so grease (not illustrated) flowing from the through hole 102 is retained in the grooves 103, maintaining good lubrication. An outer circumferential end portion 100a of the concave surface 101 is chamfered in an arc shape, making it easier for grease to flow into the concave surface 101. A diameter of the through hole 102 and the depth, width, number, or the like of the grooves 103 are not limited, and are appropriately set according to the size, mechanical strength, and the like of the separator 100. For example, the depth of the groove 103 is suitably about 5 μm to 30 μm.

The above-described roughening of the concave surface 101, formation of the through hole 102 and grooves 103, and chamfering of the outer circumferential end portion 100a can be appropriately combined.

Figure 6A:
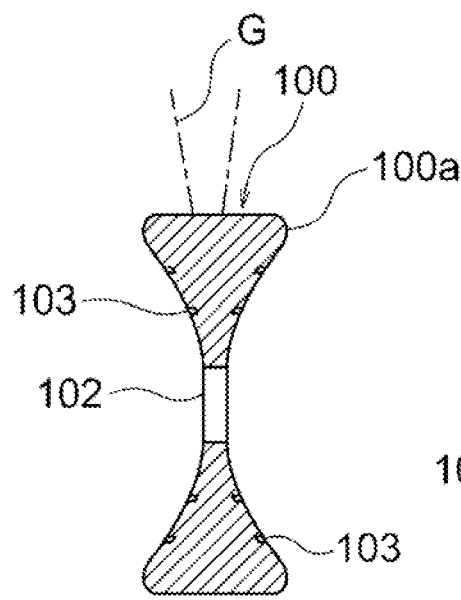
FIG. 6A is a cross-sectional view illustrating another example of the separator.
Figure 6B:
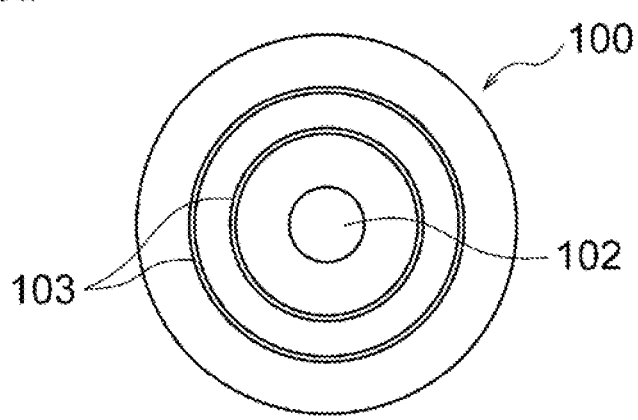
FIG. 6B is a front view thereof.

A gate shape of an injection molding machine used may be a pin gate, but it is preferable that a gate position is such that a gate G faces an outer circumferential surface of the separator 100 other than the concave surface 101 of the separator 100, for example, as illustrated in FIGS. 6A and 6B. Alternatively, although not illustrated, a gate position may be provided on the inner circumferential surface of the through hole 102.

The present invention is characterized in that, in such a linear motion device, at least one of the separator 100 and the circulation passage 18 is made of a member formed by injection molding of polyamide 410, or a part of a surface of at least one of the separator 100 and the circulation passage 18 is made of a member formed by injection molding of polyamide 410. Hereinafter, the point will be described in detail, and the description of other components will be omitted.

The present invention is characterized in that polyamide 410 has a bio degree of 100%, which will be described below.

Although polyamide 410 resin used as a base resin forming the separator 100 was initially a polycondensate of petroleum-derived tetramethylene diamine (1,4-diaminobutane, butanediamine) and sebacic acid derived from plant-derived castor oil, tetramethylene diamine has also evolved into a plant-based product made from wood chips.

Polyamide 410 is synthesized by reacting two plant-derived raw materials, tetramethylene diamine and sebacic acid, in a 1:1 ratio, and the bio degree is 100% (initially 70%), making polyamide 410 an environmentally friendly (carbon neutral) material. That is, initially, polyamide 410 had a bio degree of 70%, but tetramethylene diamine also became a plant-derived material made from wood chips, and the bio degree was improved to 100%.

Polyamide 410 described above has a water absorption rate (23° C., in water, 2 weeks) of 5.8%, which is suppressed about 73% compared to polyamide 66 (23° C., in water, 2 weeks, 8%), which is most commonly used for the separator 100 of linear motion devices. Therefore, a dimensional change due to water absorption is small and the dimensional stability is excellent, making polyamide 410 highly reliable.

A molecular weight of polyamide 410 described above is within a range that allows injection molding, specifically a number average molecular weight of 13000 to 28000, and more preferably a number average molecular weight of 18000 to 26000 considering fatigue resistance and moldability. When the number average molecular weight is less than 13000, the molecular weight is excessively low, resulting in poor fatigue resistance and low practicality. On the other hand, when the number average molecular weight exceeds 28000, the melt viscosity becomes excessively high, making it difficult to manufacture the separator 100 with high precision by injection molding, which is not preferable.

The base resin described above exhibits a high level of durability even when used alone, works advantageously against wear of a mating member (rolling element (ball B)) with which the separator 100 may come into contact, and functions sufficiently as a retainer. However, when the separator 100 is used under harsher usage conditions, it is assumed that the separator 100 will be damaged, deformed, or worn out, so reinforcing materials may be added to improve reliability.

As the reinforcing material, glass fibers, carbon fibers, aramid fibers, potassium titanate whiskers, aluminum borate whiskers, and the like are preferable, and it is more preferable to use a material which is surface-treated with a silane coupling agent or the like considering adhesion with the above-described polyamide resin. The reinforcing materials can be used in combination of a plurality of types. Considering impact strength, it is preferable to blend a fibrous material such as glass fiber or carbon fiber, and considering damage to a mating material, it is preferable to blend a whisker-like material in combination with the fibrous material. A mixing ratio in the case of mixed use varies depending on the type of fibrous material and whisker-like material, and is appropriately selected considering impact strength, damage to the mating material, and the like.

As a glass fiber, in addition to those with a general average fiber diameter of 10 μm to 13 μm, it is more preferable to use fibers with an average fiber diameter of 5 μm to 7 μm, which can increase strength and improve wear resistance with a small content, or those with irregular cross sections.

As a carbon fiber, when priority is given to strength, PAN-based carbon fibers are preferable, but pitch-based carbon fibers, which are advantageous in terms of cost, can also be used. The average fiber diameter is preferably 5 μm to 15 μm. Since the carbon fiber itself has high strength and elastic modulus, it is possible to increase the strength and elastic modulus of the retainer compared to the glass fiber.

As an aramid fiber, it is possible to suitably use para-aramid fiber, which has excellent reinforcing properties. The average fiber diameter is preferably 5 μm to 15 μm. Unlike glass fibers and carbon fibers, aramid fibers do not damage steel materials, so the retainer will not deteriorate a surface condition of the mating member that the retainer comes into contact with. Thus, it is more suitable when the acoustic characteristics or the like of the bearing are important.

When the reinforcing materials are included, the materials are preferably blended in an amount of 10% by weight to 40% by weight, particularly 15% by weight to 30% by weight of the total weight. When the blending amount of the reinforcing material is less than 10% by weight, it is not preferable because improvement in mechanical strength is small. When the blending amount of the reinforcing material exceeds 40% by weight, it is not preferable because moldability decreases and, depending on the type of reinforcing material, the damage to the mating material increases.

It is preferable to add an iodide heat stabilizer or an amine antioxidant to the resin as an additive, either alone or in combination, to prevent deterioration due to heat during molding and use.

The present invention is characterized in that the main component of a base oil of grease filled in an internal space of the linear motion device is poly-α-olefin oil, and grease that maintains favorable lubrication of linear motion devices will be described below.

The grease used in the present invention mainly contains a thickener and a base oil, the base oil is mainly composed of poly-α-olefin oil considering wettability to polyamide 410 used in the present invention, and the thickeners include urea compounds configured of amines and isocyanates, Li soaps, Li complex soaps, Ba soaps, Ba complex soaps, and the like.

Among the thickeners, urea compounds having a urea bond similar in structure to polyamide are particularly preferred because such urea compounds have excellent adsorption to polyamide resins. The base oil may be mixed with diester oil or aromatic ester oil to improve the lubricity of the poly-α-olefin oil. The mixing amount is 30% by weight or less with respect to the entire base oil.

Compared to polyamide 66, which is commonly used in separators for linear motion devices, the presence of a C10 (derived from sebacic acid) part with a long hydrocarbon chain between the amide groups makes polyamide 410 used in the present invention have excellent wettability with poly-α-olefin oil.

Other additives can also be added to the grease. Examples of additives include amine-based or phenol-based antioxidants, rust preventives such as Ca sulfonate, extreme pressure additives such as MoDTC, montanic acid ester wax, partially saponified montanic acid ester wax, polyethylene wax, and oiliness improvers such as oleic acid.

The present invention is characterized in that the grease filled in an internal space of
the linear motion device is biodegradable grease. That is, it is preferable to use a biodegradable grease in addition to the above-described grease based on poly-α-olefin oil, as this will result in a more environmentally friendly linear motion device.

As the biodegradable grease, base oils of vegetable oils such as rapeseed oil and castor oil, or synthetic fatty acid esters such as trimethylolpropane ester and pentaerythritol have excellent biodegradability and can be used.

As the thickener, calcium soap, lithium soap, lithium complex soap, urea, and bentonite can be used.

Since the base oil of the biodegradable grease is ester-based, the base oil has good wettability to polyamide 410 of the present invention.

As described above, according to the present invention, by applying polyamide 410, which has a high level of heat resistance and has lower water absorption than polyamide 66, to the resin material of the separator 100 of the linear motion device, it is possible to provide a rolling bearing that can be used in various environments and has both high reliability and low cost.

Since polyamide 410 has a bio degree of 100%, compared to materials of the related art such as polyamide 66, which contains only petroleum-derived components and has a bio degree of 0%, it is possible to create a linear motion device that is more environmentally friendly. Since polyamide 410 has a melting point close to that of polyamide 66, polyamide 410 can be used as a substitute in applications where polyamide 66 was used.

Therefore, when the same polyamide 410 is used for the resin circulation member of a linear motion device, the linear motion device can be made even more environmentally friendly.

Since there is a C10 part (derived from sebacic acid) that has a long-chain hydrocarbon part between the amide groups, by applying a grease configured of a base oil of which the main component is poly-α-olefin oil, which has a similar molecular structure, good wettability to the resin material is maintained, and thus abrasion of the resin part is effectively prevented and the lifespan of the linear motion device can be extended.

When the grease is biodegradable, the linear motion device can be made even more environmentally friendly.

In the present embodiment, the entire separator 100 is made of polyamide 410, but the separator 100 may be formed of a member made of polyamide 410 only on a surface that comes into contact with the rolling element (ball B).

The circulation passage 18 may be formed of a member made of polyamide 410. Here as well, only a passage surface with which the rolling element comes into rolling contact may be formed of a member made of polyamide 410.

Both the separator 100 and the circulation passage 18 may be formed of a member made of polyamide 410.

Second Embodiment

Figure 7:
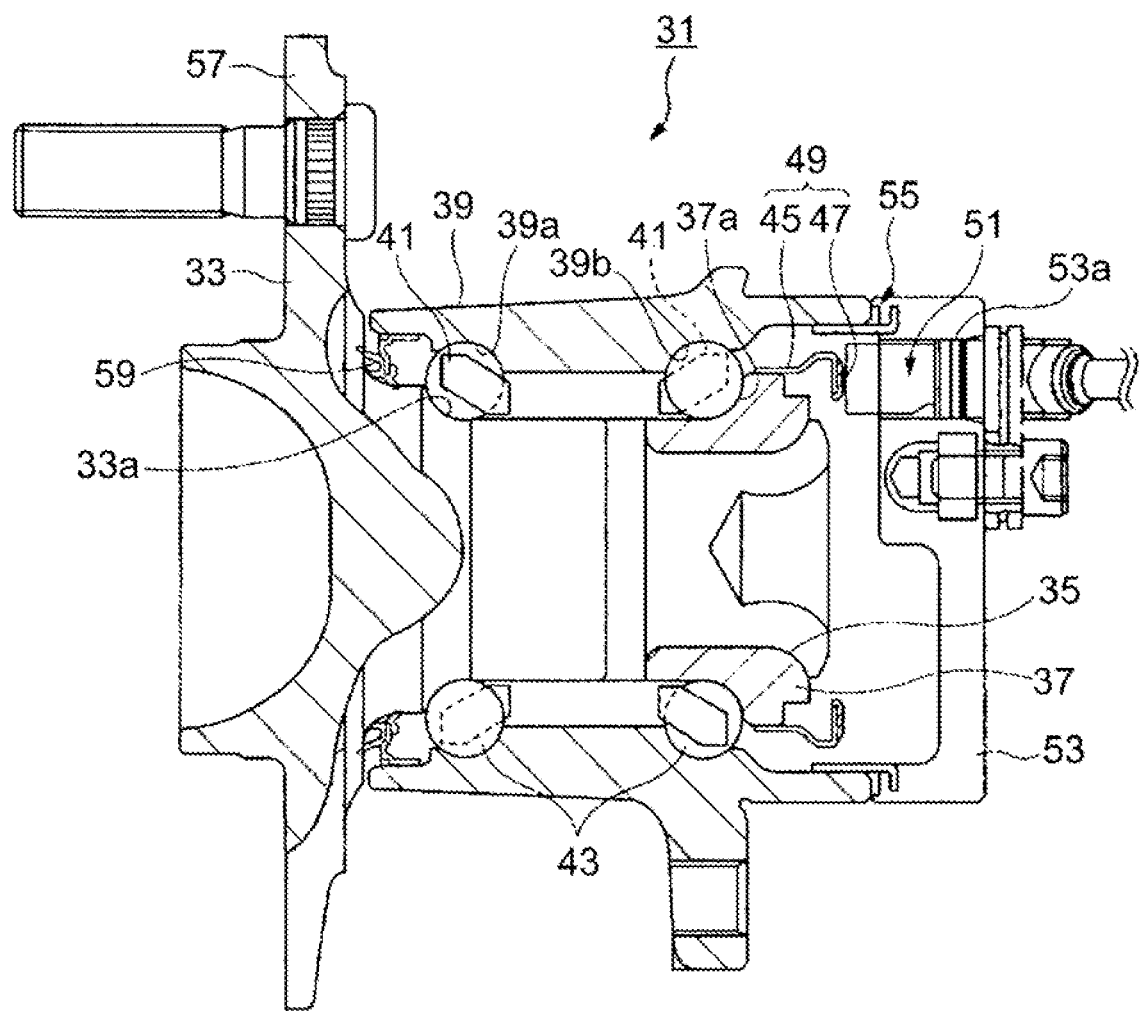
FIG. 7 is a schematic cross-sectional view illustrating a rolling bearing, which is an example of a rolling device, with some parts omitted.

FIG. 7 illustrates a wheel rolling bearing showing an example of a rolling device of the present invention, and illustrates an embodiment used in a wheel rolling bearing unit (wheel rolling bearing) for supporting a driven wheel supported by an independent suspension. In the figure, reference numeral 31 indicates a wheel rolling bearing.

The wheel rolling bearing 31 holds rolling elements (balls) 43 in a rollable manner via synthetic resin retainers (holding members) 41 in a space formed by a rolling groove 33a formed on a hub 33 and a rolling groove 37a of an inner ring (first member) 37 caulked to a caulking portion 35 at an end of the hub 33, and the rolling grooves 39a and 39b of an outer ring (second member) 39 facing respective rolling grooves 33a and 37a. A magnetic encoder 49 formed by fixing a magnet portion 47 to a slinger 45 is fixed to an end of the inner ring 37. The slinger 45 has a substantially cylindrical shape, and has a substantially L-shaped cross-sectional shape that curves outward at a position protruding from a side end surface of the inner ring 37 and further bends toward an axis.

A sensor 51 is disposed at a position facing the magnet portion 47 of the magnetic encoder 49 with a predetermined gap therebetween. In a driven wheel rolling bearing unit 31, the sensor 51 is fixed to a sensor cap 53. The sensor cap 53 is a resin lid member that is attached to cover an opening portion surrounded by the outer ring 39, and the sensor 51 is fixed while being inserted into a through hole 53a. An O-ring 55 is inserted at an end portion engaging the outer ring 39 to prevent water or foreign matter from entering from the outside. A gap between the hub 33 and the outer ring 39 on a mounting flange 57 side is sealed by a sealing device 59.

Figure 8:
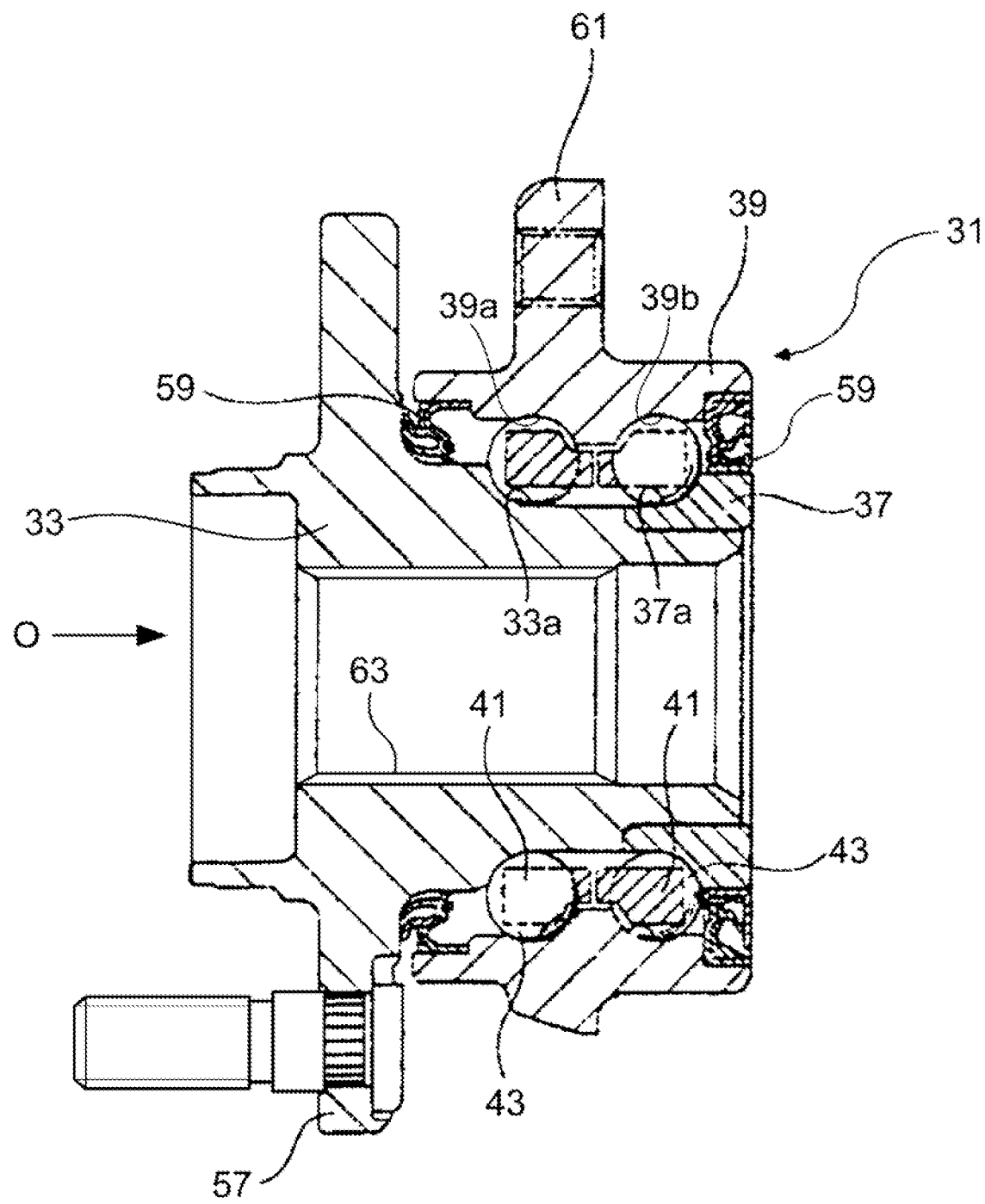
FIG. 8 is a schematic cross-sectional view illustrating another form of a rolling bearing with some parts omitted.

FIG. 8 shows another embodiment of a wheel rolling bearing, and illustrates a wheel rolling bearing unit (wheel rolling bearing) for supporting a driving wheel supported by a suspension device by a mounting portion 61 formed on an outer peripheral surface of an outer ring (second member) 39, which is a fixed wheel. In the figure, reference numeral 31 indicates a wheel rolling bearing.

In the present embodiment, rolling elements (balls) 43 are held in a rollable manner via synthetic resin retainers (holding members) 41 in spaces formed by a rolling groove 33a formed on a hub 33 and a rolling groove 37a of an inner ring (first member) 37 that is supported externally with the outer end surface thereof (left end surface in the figure) abutting against a step portion provided at an end portion of the hub 33, and rolling grooves 39a and 39b of an outer ring 39 facing respective rolling grooves 33a and 37b. A spline groove 63 is formed on an inner peripheral surface of the hub 33, and a mounting flange 57 is formed on an outer peripheral surface of an outer end portion (the end that becomes outward in a width direction when assembled to a vehicle, the left end portion in FIG. 8). Reference numeral 59 is a sealing device. When assembled to a vehicle, a drive shaft that is rotationally driven via a constant velocity joint is inserted into the spline groove 63, and a wheel is fixed to the mounting flange 57.

The rolling device of the present invention is a wheel rolling bearing as illustrated in FIGS. 7 and 8, and is characterized by a material of the synthetic resin retainer 41 assembled to the bearing and the composition of the grease also incorporated into the bearing. Various types of synthetic resin retainers that are assembled to wheel rolling bearings, such as a crown-type retainer and a cage retainer, can be employed as the synthetic resin retainer, and the design can be changed as appropriate within the scope of the present invention.

Hereinafter, the characteristic parts of the present invention will be described in detail, and regarding the configuration and effects other than the features of the present invention, the configuration and effects of a wheel rolling bearing of the related art can be used, so detailed description in the present specification will be omitted.

The synthetic resin retainer 41 employs a polyamide resin composition (melting point: 250° C.) formed using polyamide 410 resin as a base resin.

Polyamide 410 resin was initially a polycondensate of petroleum-derived tetramethylene diamine (1,4-diaminobutane, butanediamine) and sebacic acid derived from plant-based castor oil, but tetramethylene diamine has also evolved into a plant-based product made from wood chips. Polyamide 410 resin is synthesized by reacting two plant-derived raw materials, tetramethylene diamine and sebacic acid, in a 1:1 ratio, and the bio degree, which was originally 70%, has increased to 100%, making polyamide 410 resin an environmentally friendly material (carbon neutral).

Polyamide 410 resin has a water absorption rate (23° C., in water, 2 weeks) of 5.8%, which is suppressed about 73% compared to polyamide 66 (23° C., in water, 2 weeks, 8%), which is most commonly used for a retainer of a wheel rolling bearing. Therefore, a dimensional change due to water absorption is small and the dimensional stability is excellent, making polyamide 410 resin highly reliable.

The molecular weight of polyamide 410 resin is within a range that can be injection molded while containing reinforcing materials such as glass fiber, specifically, the number average molecular weight is 13000 to 28000. The molecular weight of the polyamide 410 resin is more preferably in a range of 18000 to 26000 in terms of number average molecular weight, considering fatigue resistance and moldability. When the number average molecular weight is less than 13000, the molecular weight is excessively low, resulting in poor fatigue resistance and low practicality. On the other hand, when the number average molecular weight exceeds 28000, the melt viscosity will become excessively high if a reinforcing material such as glass fiber is included, making it difficult to manufacture the retainer with high precision by injection molding, which is not preferable.

Polyamide 410 resin (base resin) shows a certain level of durability even when used as resin alone (unreinforced), works well against wear of a mating member (rolling element and outer ring) that the retainer may come into contact with, and functions sufficiently as a retainer. However, when the retainer is used under harsher usage conditions, it is assumed that the retainer will be damaged, deformed, or worn out, so reinforcing materials may be added to improve reliability.

As the reinforcing material, glass fibers, carbon fibers, aramid fibers, potassium titanate whiskers, aluminum borate whiskers, and the like are preferable, and it is more preferable to use a material which is surface-treated with a silane coupling agent or the like considering adhesion with the above-described polyamide resin.

The reinforcing materials can be used in combination of a plurality of types.

Considering impact strength, it is preferable to blend a fibrous material such as glass fiber or carbon fiber, and considering damage to a mating material, it is preferable to blend a whisker-like material in combination with the fibrous material. A mixing ratio in the case of mixed use varies depending on the type of fibrous material and whisker-like material, and is appropriately selected considering impact strength, damage to the mating material, and the like.

As a glass fiber, in addition to those with a general average fiber diameter of 10 µm to 13 µm, it is more preferable to use fibers with an average fiber diameter of 5

μm to 7 μm, which can increase strength and improve wear resistance with a small content, or those with irregular cross sections.

As a carbon fiber, when priority is given to strength, PAN-based carbon fibers are preferable, but pitch-based carbon fibers, which are advantageous in terms of cost, can also be used. The average fiber diameter is preferably 5 μm to 15 μm. Since the carbon fiber itself has high strength and elastic modulus, it is possible to increase the strength and elastic modulus of the retainer compared to the glass fiber.

As an aramid fiber, it is possible to suitably use para-aramid fiber, which has excellent reinforcing properties. The average fiber diameter is preferably 5 μm to 15 μm. Unlike glass fibers and carbon fibers, aramid fibers do not damage steel materials, so the retainer will not deteriorate a surface condition of the mating member that the retainer comes into contact with. Thus, it is more suitable when the acoustic characteristics or the like of the bearing are important.

The reinforcing materials are preferably blended in an amount of 0% by weight to 10% by weight of the total weight. When the blending amount of reinforcing material exceeds 10% by weight, it is not preferable because moldability is reduced and flexibility required for a retainer for a wheel rolling bearing is also reduced.

It is preferable to add an iodide heat stabilizer or an amine antioxidant to the resin as an additive, either alone or in combination, to prevent deterioration due to heat during molding and use.

Grease that maintains the good lubrication state of the wheel rolling bearing of the present invention will be described below.

The grease used in the present invention mainly contains a thickener and a base oil. The base oil is mainly composed of poly-α-olefin oil considering wettability to the polyamide 410 resin used in the present invention, and the thickener includes urea compounds configured of amines and isocyanates, Li soaps, Li complex soaps, Ba soaps, Ba complex soaps, and the like.

Among the thickeners, urea compounds having a urea bond similar in structure to polyamide are particularly preferred because such urea compounds have excellent adsorption to polyamide resins. The base oil may be mixed with diester oil or aromatic ester oil to improve the lubricity of the poly-α-olefin oil. The mixing amount is 30% by weight or less with respect to the entire base oil.

Compared to polyamide 66, which is commonly used in retainers for wheel rolling bearings, the presence of a C10 (derived from sebacic acid) part with a long hydrocarbon chain between the amide groups makes the polyamide 410 resin used in the present invention have excellent wettability with poly-α-olefin oil.

Other additives can also be added to the grease. Examples of additives include amine-based or phenol-based antioxidants, rust preventives such as Ca sulfonate, extreme pressure additives such as MoDTC, montanic acid ester wax, partially saponified montanic acid ester wax, polyethylene wax, and oiliness improvers such as oleic acid.

It is preferable to use a biodegradable grease in addition to the grease based on poly-α-olefin oil, as this will result in a more environmentally friendly rolling bearing.

As the biodegradable grease, base oils of vegetable oils such as rapeseed oil and castor oil, or synthetic fatty acid esters such as trimethylolpropane ester and pentaerythritol have excellent biodegradability and can be used.

As the thickener, calcium soap, lithium soap, lithium complex soap, urea, and bentonite can be used.

Since the base oil of the biodegradable grease is ester-based, the base oil has good wettability to the polyamide 410 resin of the present invention.

SPECIFIC EMBODIMENT EXAMPLES

The present invention will be further described below by giving the embodiment examples and comparative examples.

Preparation of Holding Member

Using the polyamide resins (resin pellets) shown in Table 1, holding members, for example, the separator shown in the first embodiment and the synthetic resin retainer shown in the second embodiment (embodiment examples/comparative examples), can be produced by injection molding. It is preferable to use a pin gate during injection molding. When comparing performance, a comparative holding member (comparative example) can be made of polyamide 66, which has been used in the field. It is preferable that each of the resins contains 0% by mass to 10% by mass of fibrous reinforcing material.

TABLE 1

| Holding member composition | | |
|---|---|---|
| | Embodiment example | Comparative example |
| Base resin | polyamide 410 | polyamide 66 |
| Melting point (° C.) | 250 | 265 |
| Bio degree (%) | 100 | 0 |

Base resin for embodiment example: DSM EcoPaXX (EcoPaXX (registered trademark)) Q170EH (thermal stabilizer-containing grade, average molecular weight unknown)

Base resin for comparative example: BASF polyamide 66 resin (Ultramid (registered trademark) A4H (heat stabilizer-containing grade, average molecular weight unknown)

According to the present embodiment, by forming the holding member by polyamide 410 (melting point 250° C.) and making the base resin to have low water absorbency, in the related art, polyamide 66 used for the holding member eliminates the possibility of problems caused by changes in a gap due to changes in dimensions due to water absorption, improving reliability.

By using sebacic acid derived from plant-derived castor oil and plant-derived tetramethylene diamine as raw materials, the bio degree is 100%, making polyamide 410 an environmentally friendly material (carbon neutral).

Therefore, since polyamide 410 has a bio degree of 100%, the rolling device can be made into a rolling device that is more environmentally friendly than polyamide 66 or the like, which is made only of petroleum-derived components of the related art and has a bio degree of 0%. Since the melting point of polyamide 410 as 250° C. and the melting point of polyamide 66 as 265° C. is close, it can be seen from Table 1 that polyamide 410 can be used as a substitute in applications where polyamide 66 was used.

Evaluation of Dimensional Stability

By leaving each holding member of the embodiment example and the comparative example under the following condition I or condition II, and measuring the amount of change in an outer diameter dimension of the holding member after a predetermined period of time, the dimensional stability of the holding member can be evaluated.

Under any conditions, it is desirable that the amount of change is 50 μm or less.

Condition I: 60° C., 90% RH, 70 hr
Condition II: 80° C., 90% RH, 70 hr

Durability Evaluation

When evaluating durability, it is preferable to conduct evaluation under the following conditions for excellent so-called cost performance.

Condition I: 30° C., 50% RH
Condition II: 50° C., 90% RH
Condition III: 80° C., 50% RH Each test body (separator) of the embodiment example and the comparative example is assembled into an actual ball screw (shaft diameter approximately ϕ 40 mm, lead approximately 20 mm, preloaded with an oversized ball), and the steering operation is repeated under the above-described conditions I to III.

The durability of the synthetic resin retainer can be evaluated by incorporating each of the retainers of the embodiment example and the comparative example into a wheel rolling bearing unit and repeatedly performing steering operations under the above-described conditions I to III.

Under any conditions, when continuous operation for 1000 hours (shaft rotation speed: 1000 $min^{-1}$) is possible, the retainer can be evaluated as a pass "O", and when continuous operation for 1000 hours cannot be achieved, the retainer can be evaluated as a fail "X".

The comparative embodiment made of highly water-absorbent polyamide resin of the related arts has poor dimensional stability under harsh conditions of high temperature and high humidity, and is thought to have a corresponding loss of durability.

Here, it is preferable that the base oil of the grease filling the internal space be poly-α-olefin oil (approximately 5.7 $mm^2$/s at 100° C.), and an aliphatic diurea compound be used as a thickener (thickener amount: about 13% by weight) and various additives be blended to achieve consistency No. 2, and further as additives, extreme pressure additives, antioxidants, and rust inhibitors shall be contained in normal amounts. A grease composition having such a composition has excellent durability and is less aggressive to resins, so it is preferably used when evaluating the durability of resin parts.

The amount of grease filled in the test ball screw is preferably 7% of the space volume of the ball screw, which is smaller than usual, to see the difference due to the resin material in a so-called accelerated manner.

When installing the test bearing, the preload load was 1500 N, the test rotation speed was 10000 $min^{-1}$, and the amount of grease filled was 7% of the bearing space volume, which is smaller than usual, to see the difference due to the resin material, such that evaluation can be performed in a relatively short time.

Evaluation of Ease of Assembly

Regarding the crown-shaped retainer (embodiment example, comparative example) assembled to the wheel rolling bearing illustrated in FIG. 8, an assembly test is performed using an automatic assembly tester (not illustrated), and after the test, whitening, cracking, and deformation of retainer claws can be confirmed. It is desired that n=10 tests are performed on each retainer and that no abnormality is found in any of the tests.

While the embodiment examples are considered to pass all tests, the comparative examples made of highly water-absorbing polyamide resins of the related arts have poor dimensional stability under harsh conditions of high temperature and high humidity, and are thought to have correspondingly low durability. In terms of ease of assembly, both the embodiment examples and the comparative examples are considered to be at the same level.

Heat Resistance Comparative Evaluation

Regarding PA410 non-reinforced material (DSM Eco-PaXX (registered trademark) Q170EH, heat stabilizer containing grade, average molecular weight unknown) and PA66 non-reinforced material (BASF Ultramid A4H, heat stabilizer containing grade), heat resistance was evaluated in an environment of 120° C. using a tensile test piece molded by injection molding. The tensile strength retention rate (initial value is 100) and strain retention rate after 1000 hours are shown in Table 2 below.

TABLE 2

| Heat resistance evaluation result (120° C., after 1000 hours) | | |
|---|---|---|
|  | Embodiment (PA410) | Comparative example (PA66) |
| Tensile strength retention rate | 101.2 | 101.2 |
| Strain retention rate | 134.1 | 109.4 |

As is clear from Table 2, at 120° C., which assumes the harshest operating environment for linear motion devices and the operating environment for ordinary wheel rolling bearings, even after 1000 hours, the tensile strength and strain hardly changed, and there was no difference in the degree of change from PA66, so it was confirmed that PA410 can be used as a substitute for PA66.

Grease Resistance Comparison

Regarding PA410 non-reinforced material (DSM Eco-PaXX (registered trademark) Q170EH, heat stable grade) and PA66 non-reinforced material (BASF Ultramid (registered trademark) A4H, heat stable grade), a tensile test piece molded by injection molding was immersed in mineral oil-urea grease in an environment of 120° C. to evaluate grease resistance. The tensile strength retention rate (initial value is 100) and strain retention rate after 1000 hours are shown in Table 3 below.

TABLE 3

| Grease resistance evaluation result (120° C., after 1000 hours) | | |
|---|---|---|
|  | Embodiment (PA410) | Comparative example (PA66) |
| Tensile strength retention rate | 102.6 | 102.6 |
| Strain retention rate | 119.2 | 90.6 |

As is clear from Table 3, at 120° C., which assumes the harshest operating environment for linear motion devices and the operating environment for ordinary wheel rolling bearings, even after 1000 hours passed, the tensile strength and distortion hardly changed, and there was no difference in the degree of grease resistance from PA66, so it was confirmed that PA410 can be used as a substitute for PA66.

REFERENCE SIGNS LIST

1: guide rail (first member)
2: slider (second member)
3: rolling groove
4: ball circulation path
10: linear guide device
11: screw shaft (first member)
12: ball nut (second member)
13: ball tube
14: ball groove
18: ball circulation path
20: ball screw device
100: separator (holding member)
101: concave surface
102: through hole
103: groove
B: ball
31: wheel rolling bearing
43: rolling element
37: inner ring (first member)
39: outer ring (second member)
41: synthetic resin retainer (holding member)

The invention claimed is:

1. A rolling device comprising: a first member and a second member that are movable relative to each other; a rolling element installed between the first member and the second member; and a holding member that holds the rolling element, wherein
the holding member is formed from a polyamide resin composition made of polyamide 410, and
a bio degree of the polyamide 410 is 100%.

2. The rolling device according to claim 1, wherein
the rolling device is a linear motion device in which the first member is a shaft, the second member is a linear motion body that moves straight along the shaft, the rolling element is a plurality of balls held in a ball groove formed on an inner surface side of the linear motion body and rolling between the ball groove and the shaft, and the holding member is a separator interposed between each of the balls, and a circulation passage is provided that is formed in the linear motion body and circulates the balls from one end side to the other end side of the ball groove.

3. The rolling device according to claim 2, wherein
at least one of the separator and the circulation passage is formed of a polyamide resin composition made of polyamide 410.

4. The linear motion device according to claim 2, wherein
a part of a surface of at least one of the separator and the circulation passage is formed of a polyamide resin composition made of polyamide 410.

5. The rolling device according to claim 1, wherein
the first member is an inner ring, the second member is an outer ring, and the holding member is a synthetic resin retainer.

6. The rolling device according to claim 5, wherein
the polyamide resin composition further includes a reinforcing fiber material.

7. The rolling device according to claim 1, wherein:
an internal space of the rolling device is filled with grease; and
a main component of base oil of the grease is poly-α-olefin oil.

8. The rolling device according to claim 1, wherein:
an internal space of the rolling device is filled with grease; and
the grease is biodegradable grease.

9. A rolling device comprising: a first member and a second member that are movable relative to each other; a rolling element installed between the first member and the second member; and a holding member that holds the rolling element, wherein
the holding member is formed from a polyamide resin composition made of polyamide 410, and
the rolling device is a linear motion device in which the first member is a shaft, the second member is a linear motion body that moves straight along the shaft, the rolling element is a plurality of balls held in a ball groove formed on an inner surface side of the linear motion body and rolling between the ball groove and the shaft, and the holding member is a separator interposed between each of the balls, and a circulation passage is provided that is formed in the linear motion body and circulates the balls from one end side to the other end side of the ball groove.

* * * * *